(12) United States Patent
Koda et al.

(10) Patent No.: US 8,125,880 B2
(45) Date of Patent: Feb. 28, 2012

(54) INFORMATION RECORDING APPARATUS AND METHOD, COMPUTER PROGRAM

(75) Inventors: Takeshi Koda, Saitama (JP); Keiji Katata, Saitama (JP); Masahiro Kato, Saitama (JP); Masayoshi Yoshida, Saitama (JP); Masahiro Miura, Saitama (JP); Eiji Muramatsu, Saitama (JP); Shoji Taniguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 589 days.

(21) Appl. No.: 12/158,528

(22) PCT Filed: Dec. 20, 2006

(86) PCT No.: PCT/JP2006/325386
§ 371 (c)(1),
(2), (4) Date: Jul. 2, 2008

(87) PCT Pub. No.: WO2007/072862
PCT Pub. Date: Jun. 28, 2007

(65) Prior Publication Data
US 2009/0296539 A1 Dec. 3, 2009

(30) Foreign Application Priority Data
Dec. 22, 2005 (JP) .................................. 2005-370903

(51) Int. Cl.
*G11B 7/24* (2006.01)
(52) U.S. Cl. .................... 369/275.3; 369/59.25; 369/94; 369/53.24

(58) Field of Classification Search ........................ None
See application file for complete search history.

(56) References Cited

U.S. PATENT DOCUMENTS
7,164,640 B2 * 1/2007 Sasaki .......................... 369/53.2
(Continued)

FOREIGN PATENT DOCUMENTS
JP 2000-311346 11/2000
(Continued)

OTHER PUBLICATIONS
International Search Report PCT/JP2006/325386.

*Primary Examiner* — Joseph Haley
*Assistant Examiner* — Henok Heyi
(74) *Attorney, Agent, or Firm* — Young & Thompson

(57) ABSTRACT

An information recording apparatus (200) is provided with: a recording device (353) for recording data onto an information recording medium (100) being provided with a first recording layer (L0) and a second recording layer (L1); a first controlling device (354) for controlling the recording device to record the data into each of the first recording layer and the second recording layer; a forming device (354) for forming a compatibility area (106, 109, 116, 119) for realizing reproduction compatibility of the information recording medium on an information recording apparatus, following the data recorded in each of the first recording layer and the second recording layer; and a second controlling device (354) for controlling the recording device to record the data into the formed compatibility area if the data is recorded after the compatibility area is formed.

3 Claims, 13 Drawing Sheets

U.S. PATENT DOCUMENTS

| | | | |
|---|---|---|---|
| 2006/0077883 A1* | 4/2006 | Ando et al. | 369/275.3 |
| 2006/0198265 A1* | 9/2006 | Sasaki | 369/53.24 |
| 2006/0285449 A1* | 12/2006 | Tazaki | 369/44.26 |
| 2007/0025210 A1* | 2/2007 | Kishigami et al. | 369/47.53 |
| 2007/0081795 A1* | 4/2007 | Katata et al. | 386/125 |
| 2007/0153661 A1* | 7/2007 | Ando et al. | 369/59.25 |
| 2007/0217298 A1* | 9/2007 | Koda et al. | 369/30.23 |
| 2008/0232232 A1* | 9/2008 | Kuroda et al. | 369/275.3 |

FOREIGN PATENT DOCUMENTS

| | | |
|---|---|---|
| JP | 2001-23237 | 1/2001 |
| JP | 2003-85944 | 3/2003 |
| JP | 2005-093032 | 4/2005 |
| JP | 2005-276270 | 10/2005 |
| JP | 2006-031740 | 2/2006 |
| JP | 2006-338770 | 12/2006 |
| WO | WO 2005/083709 A1 | 9/2005 |

\* cited by examiner

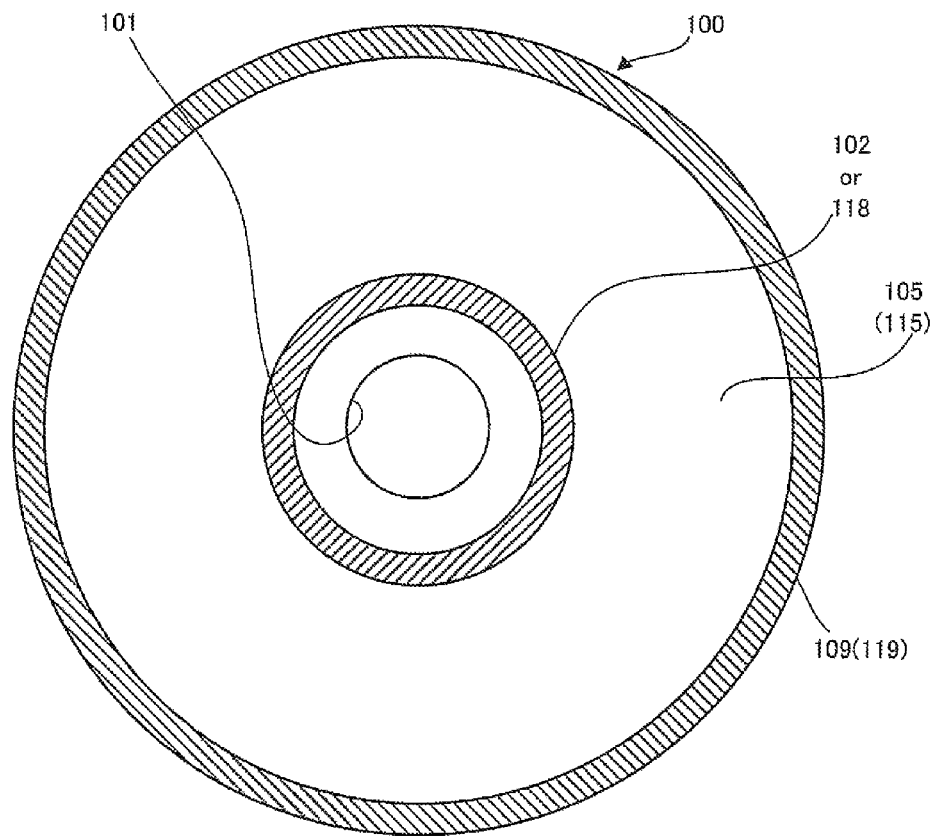
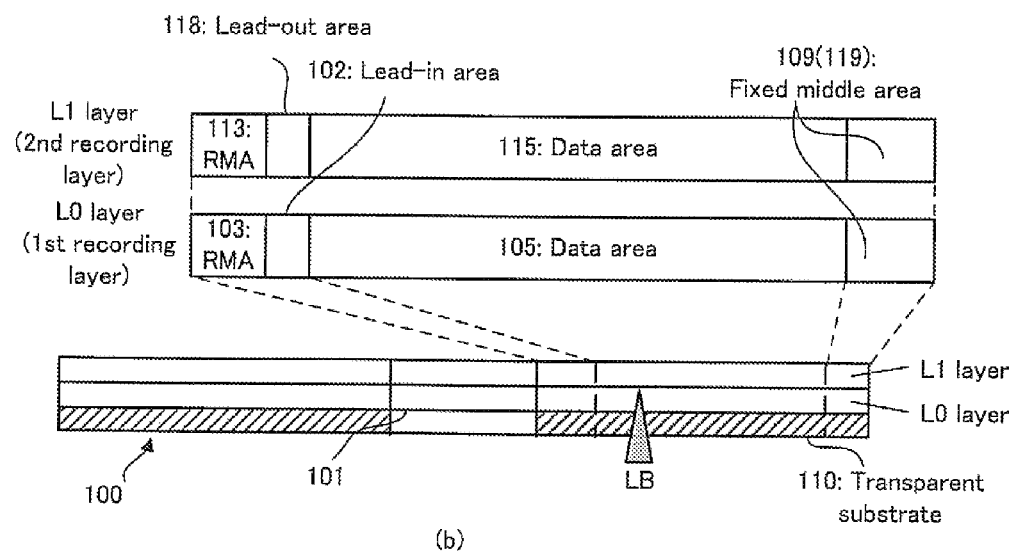

[FIG. 2]
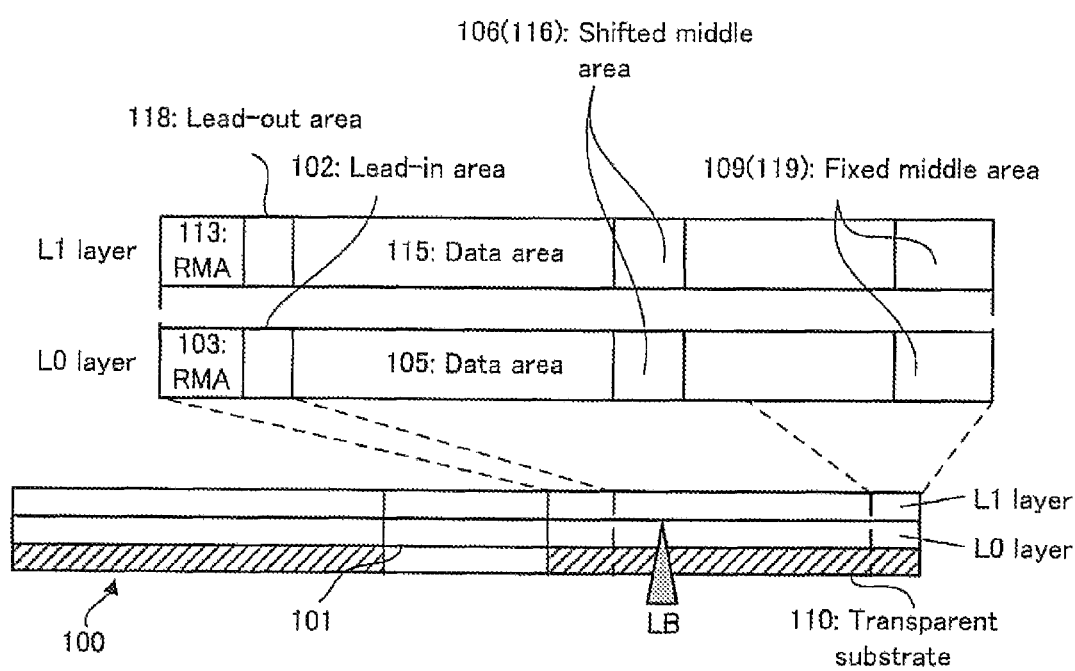

[FIG. 3]
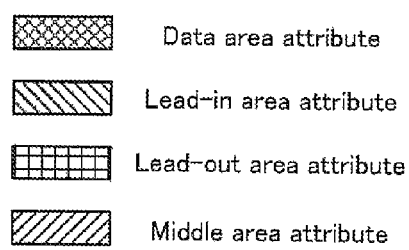
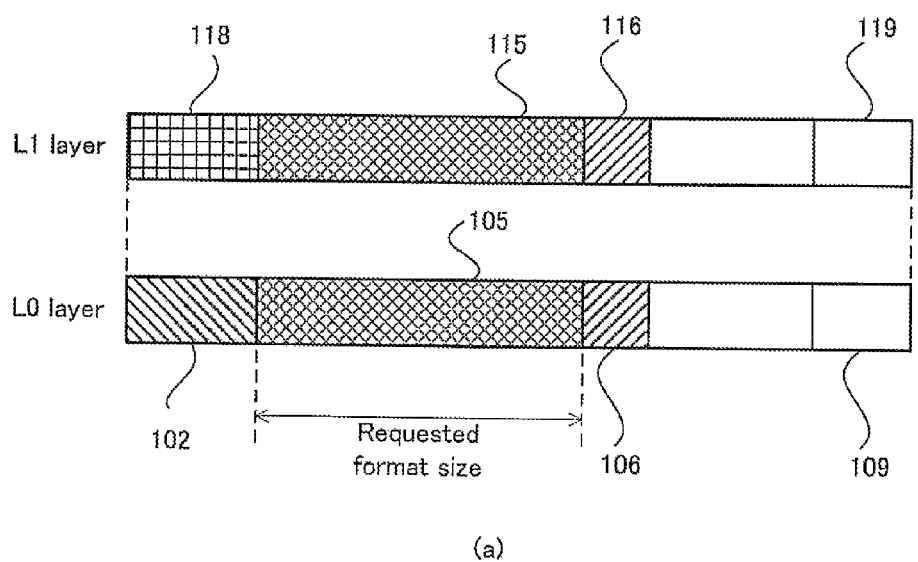
(a)
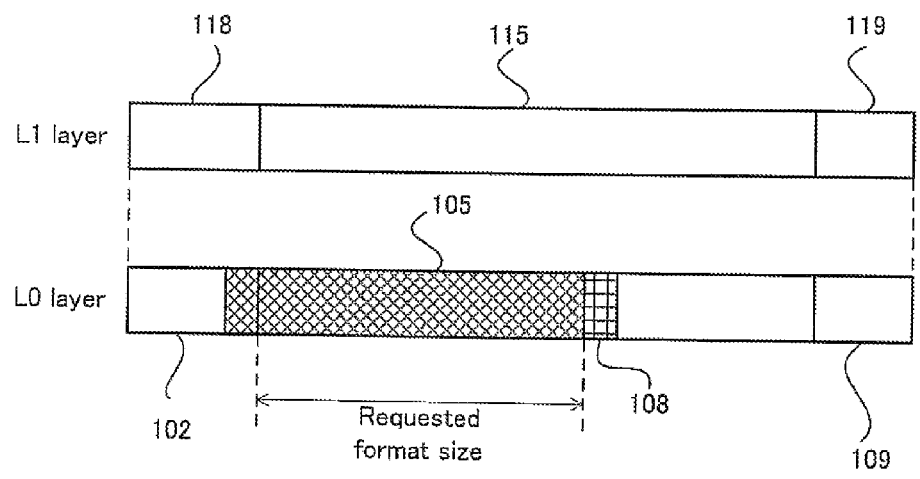
(b)

[FIG. 4]
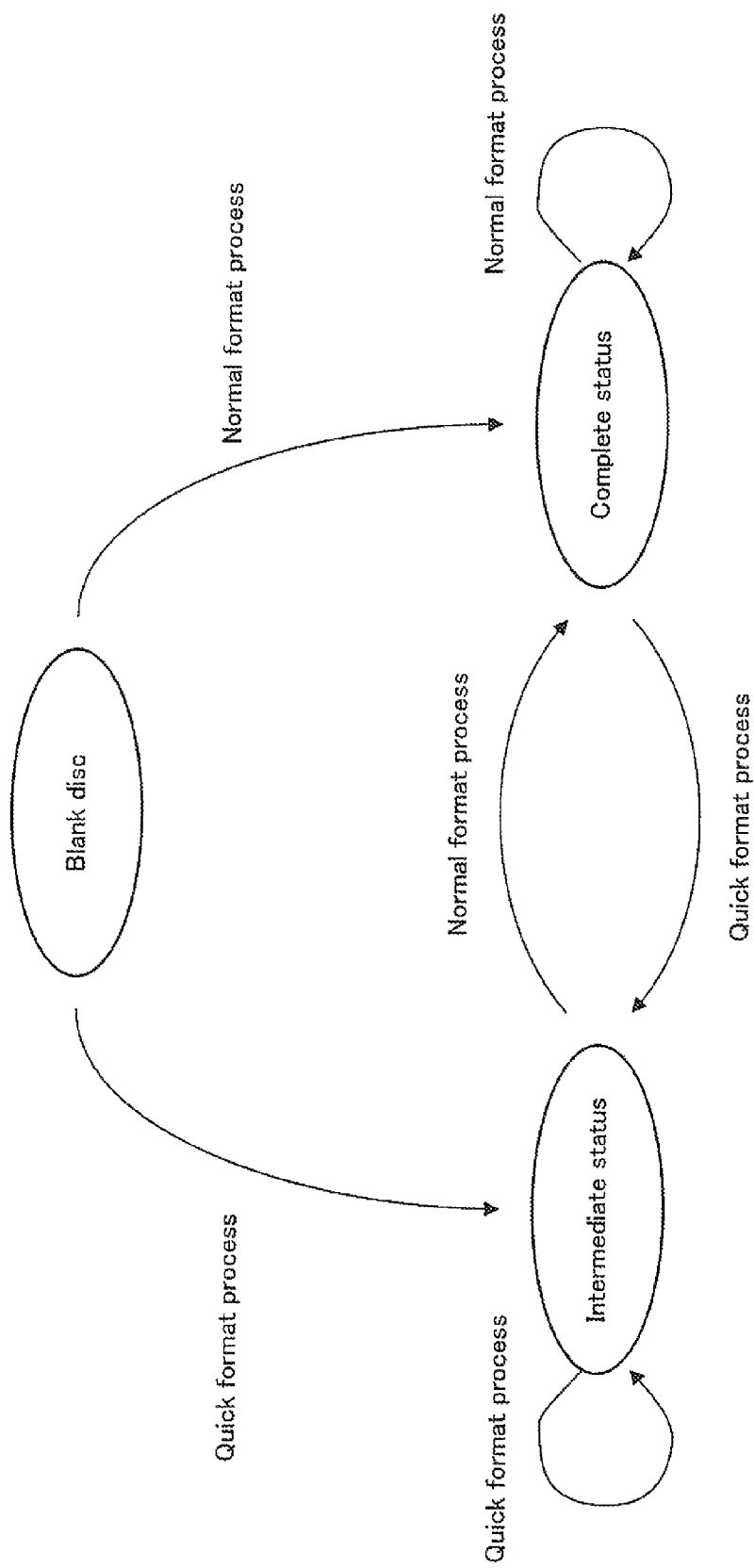

[FIG. 5]
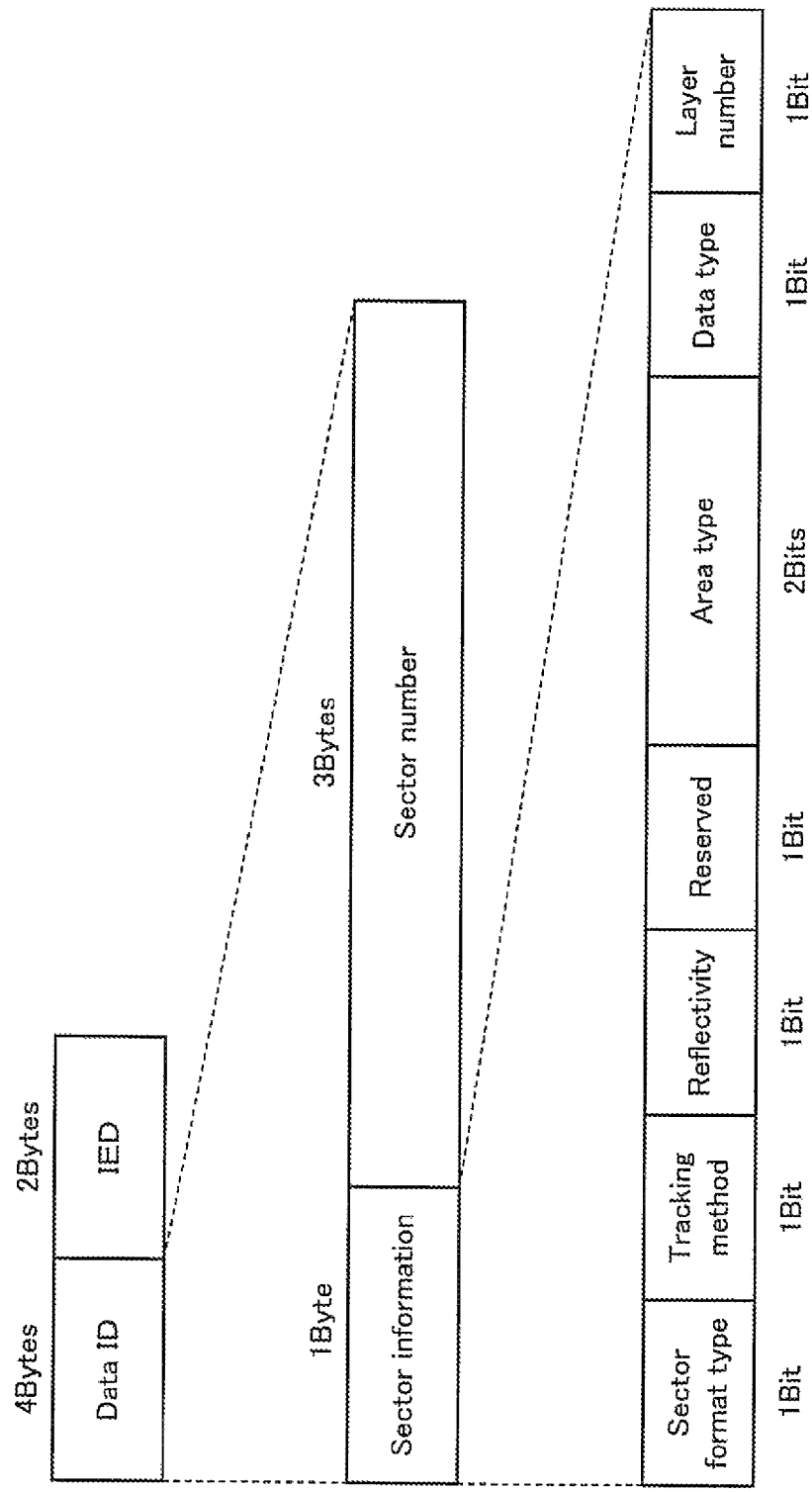

[FIG. 6]
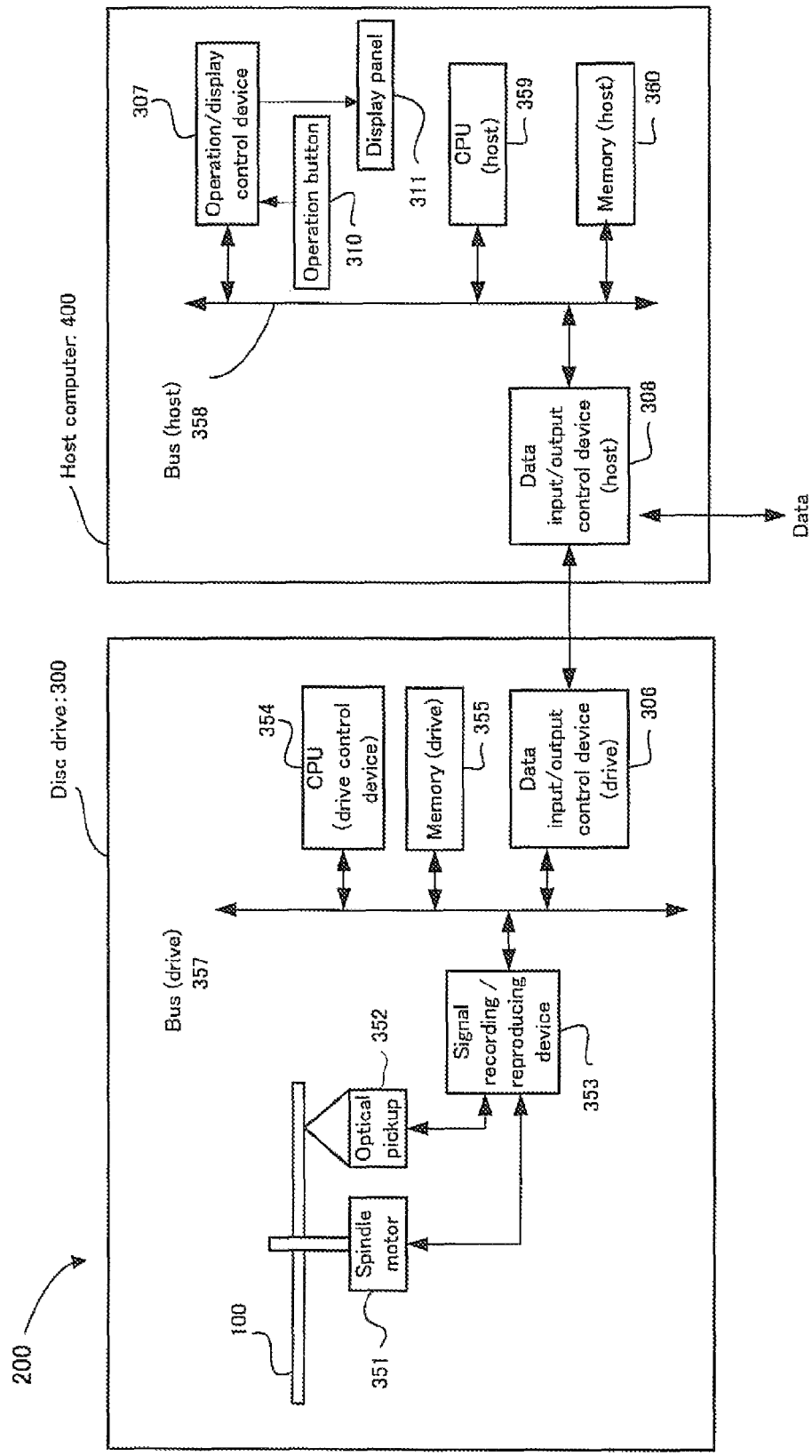

[FIG. 7]
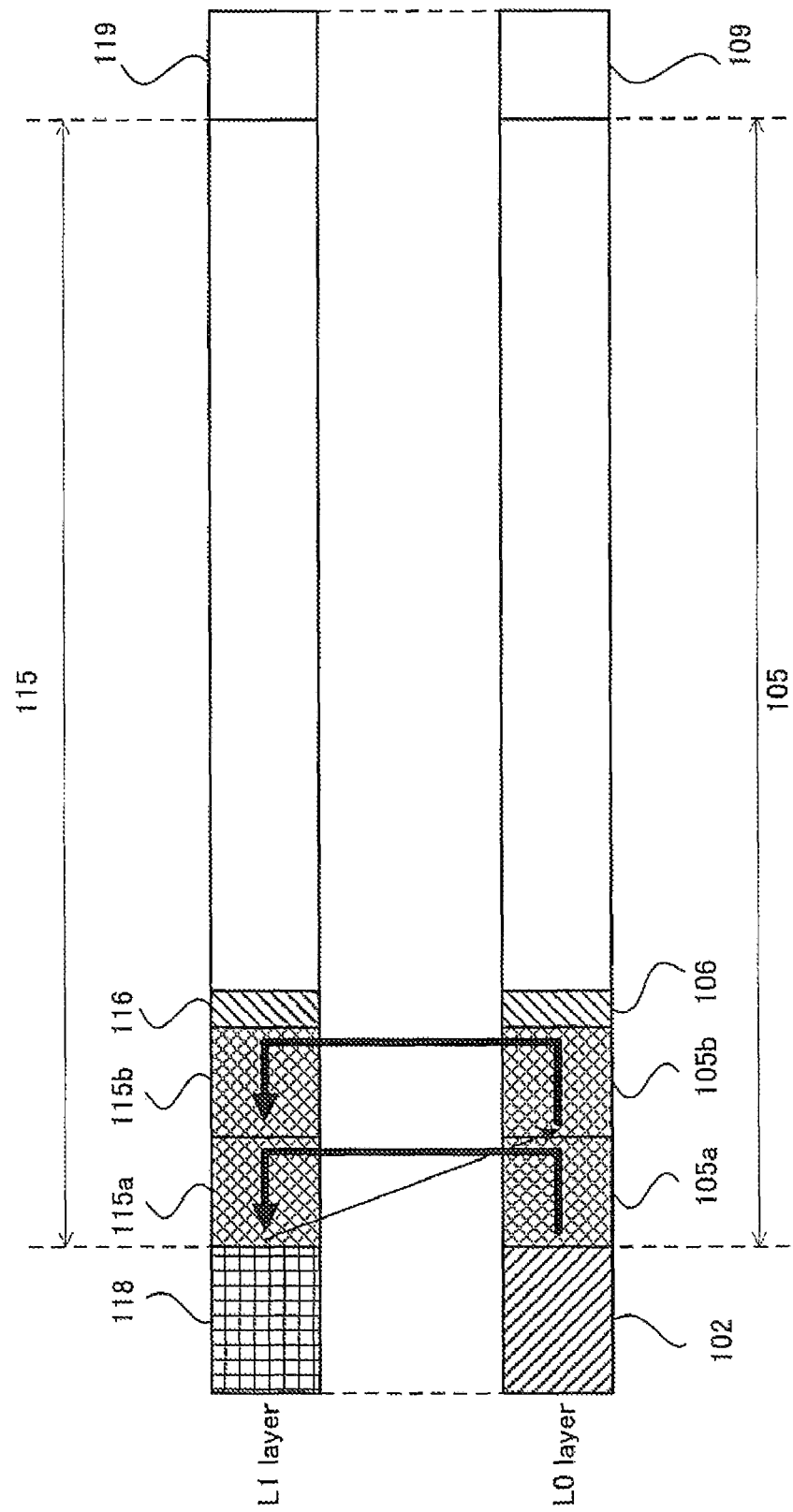

[FIG. 8]
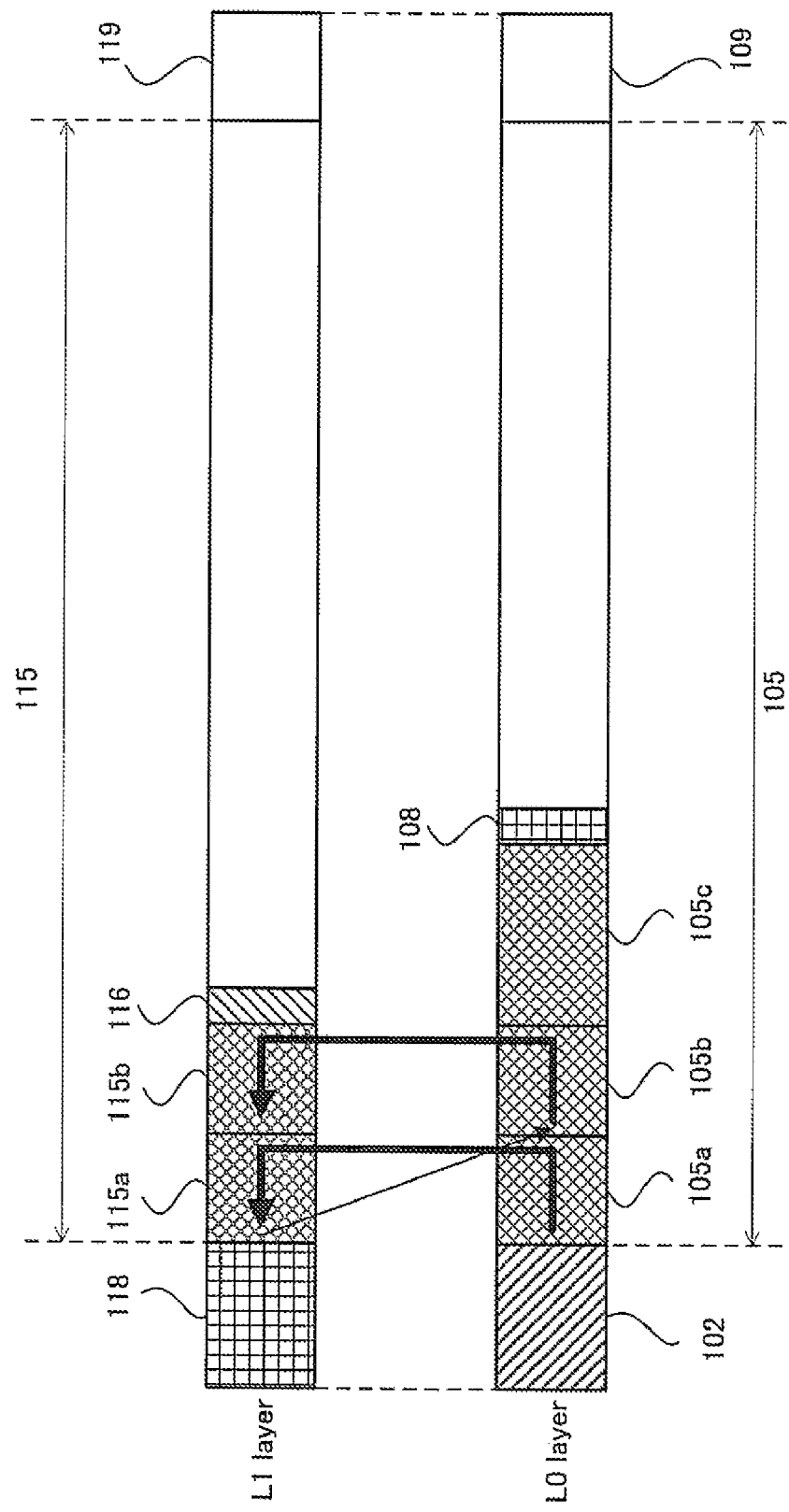

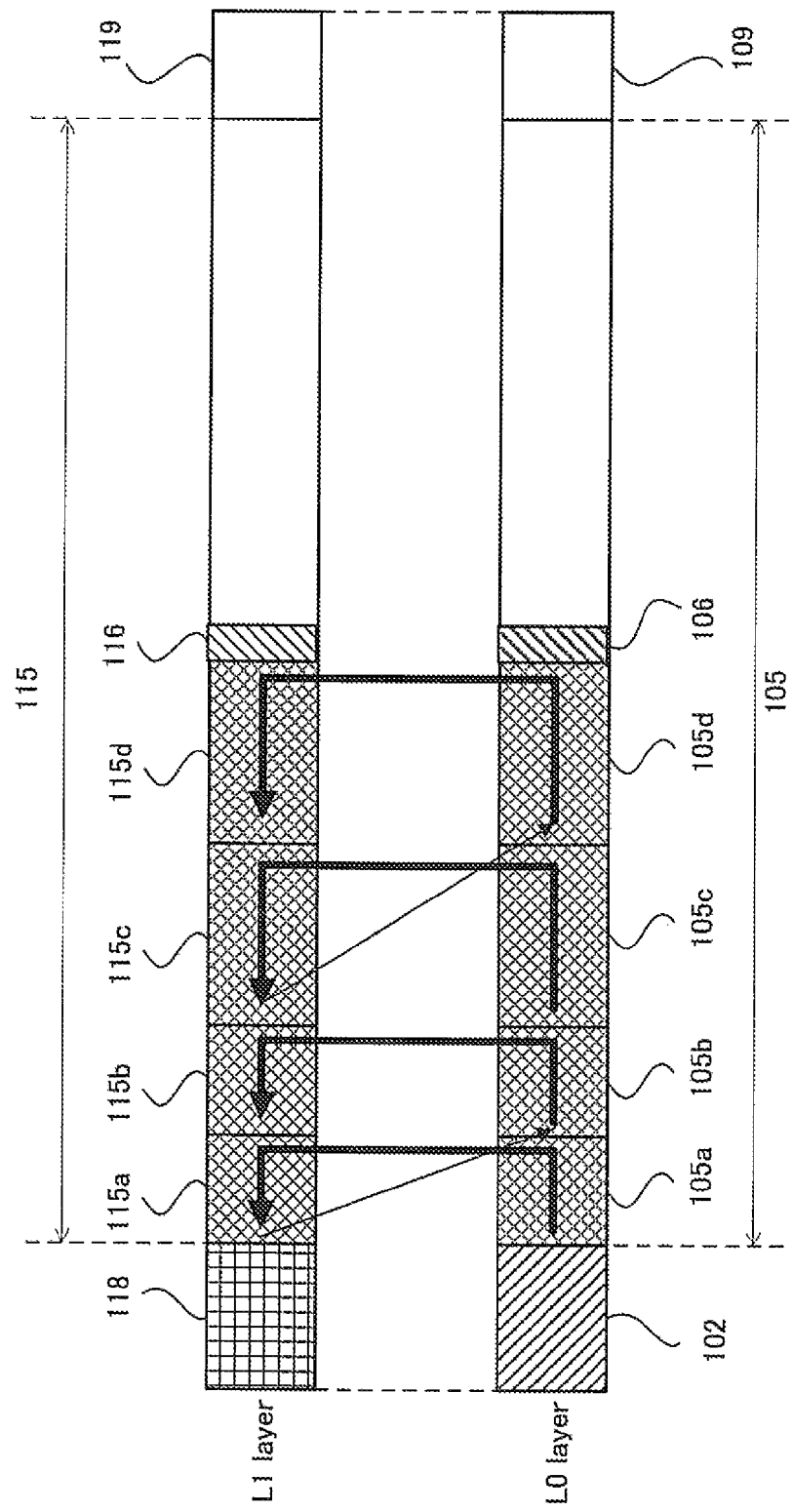

[FIG. 10]
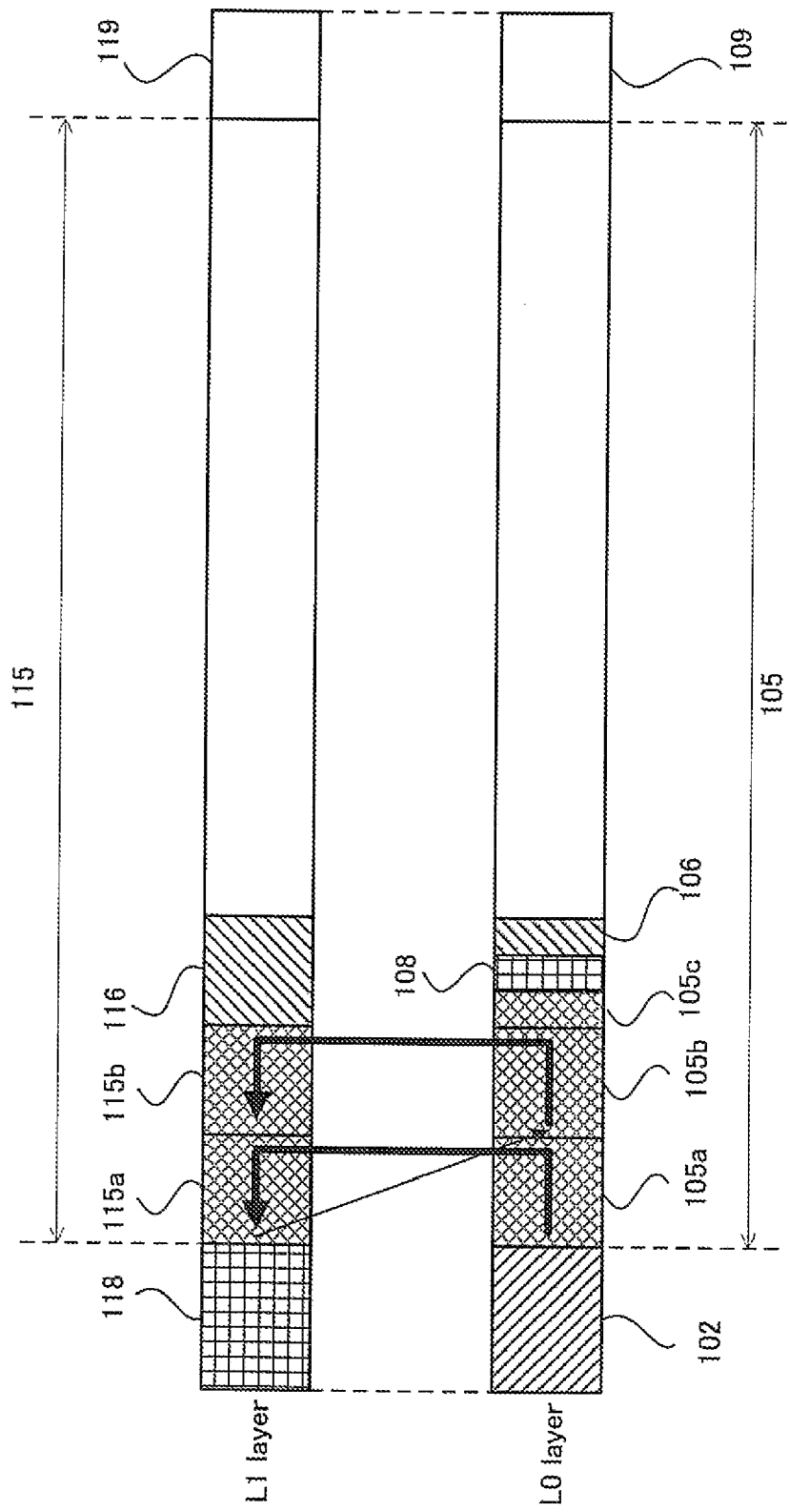

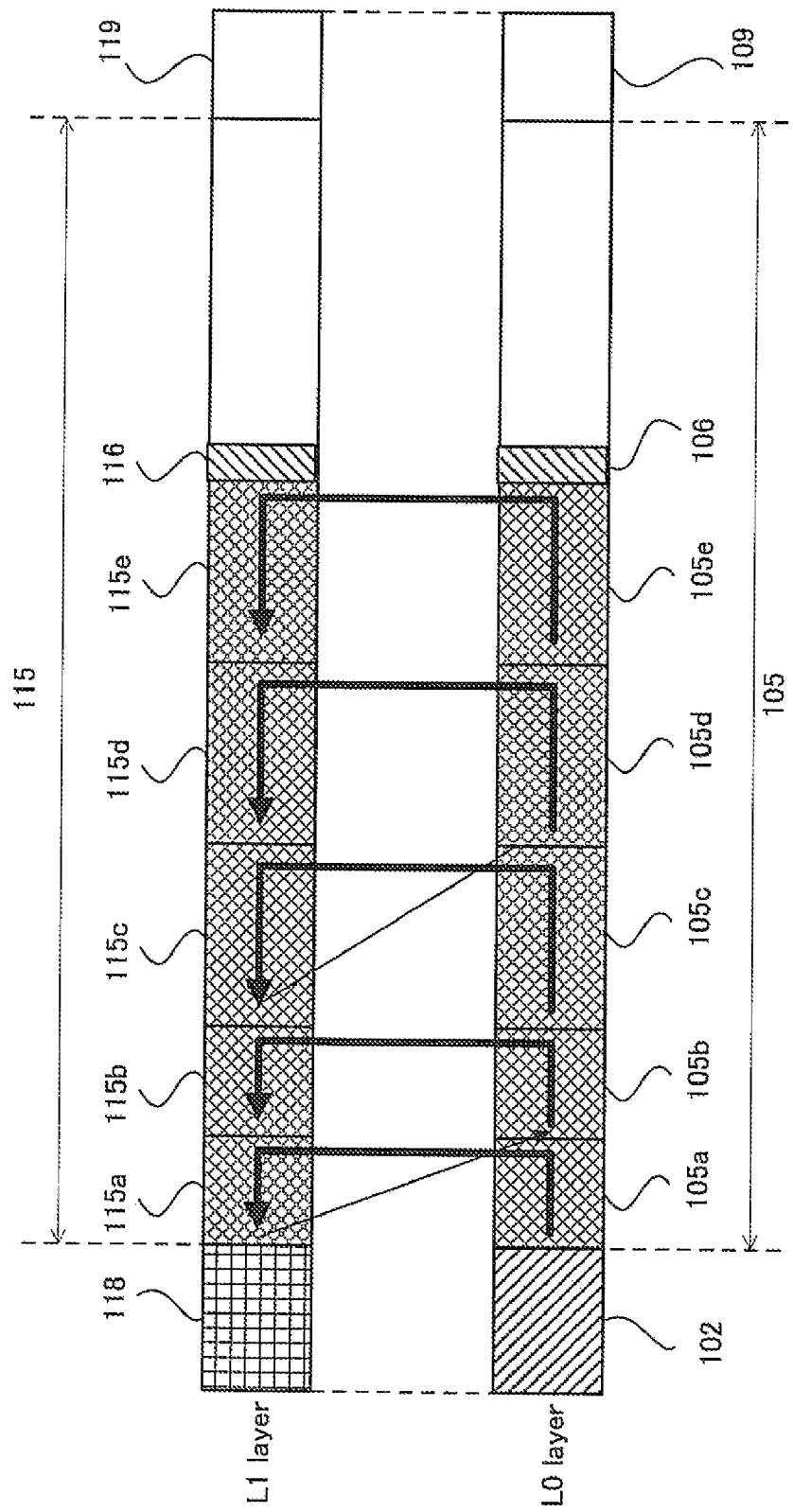
[FIG. 11]

[FIG. 12]
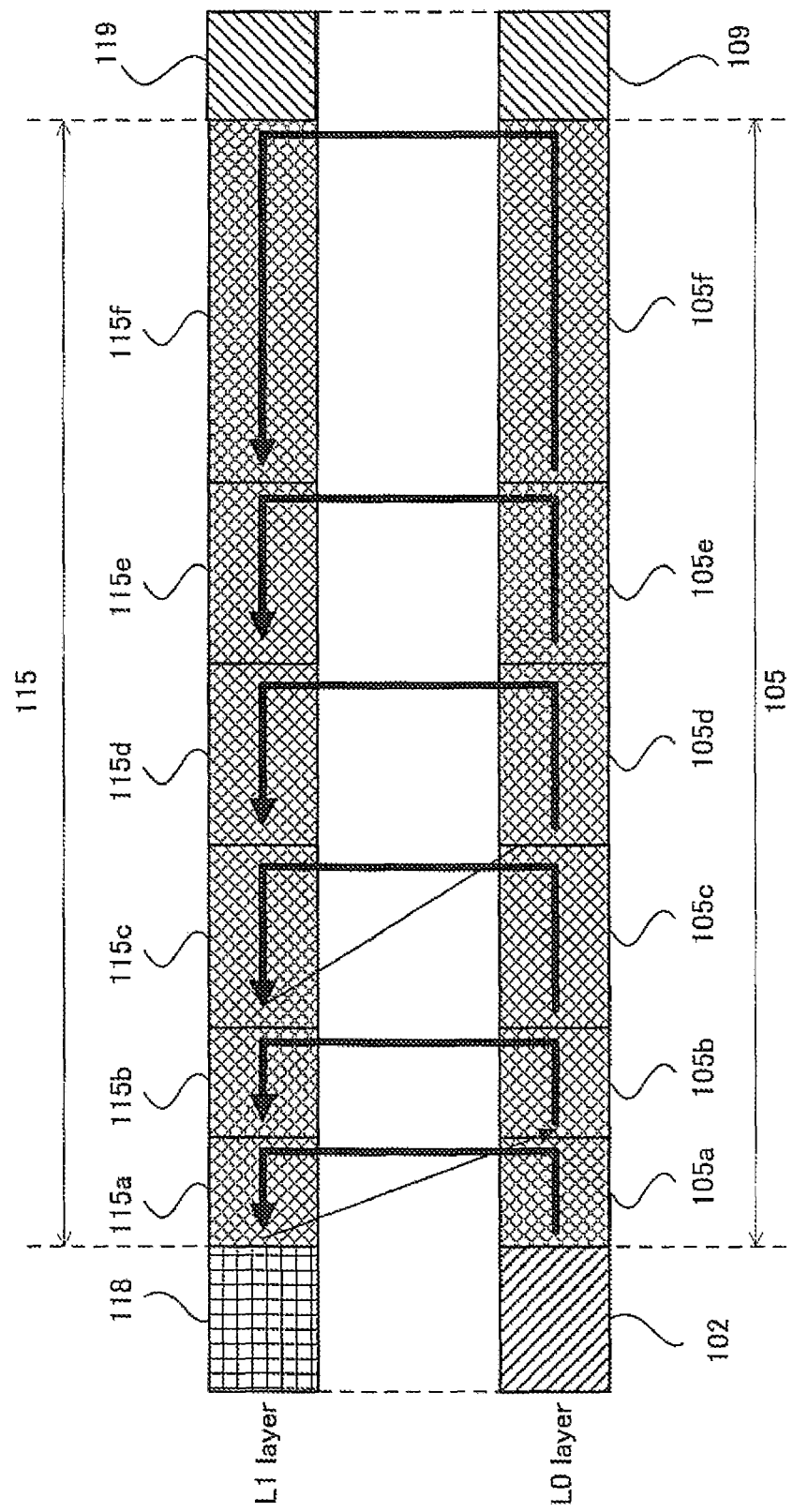

[FIG. 13]
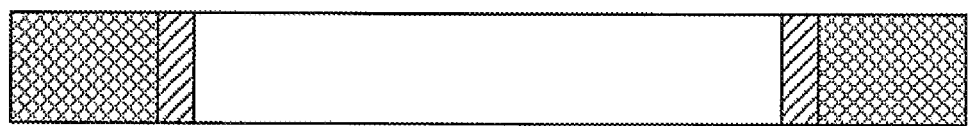
(a)
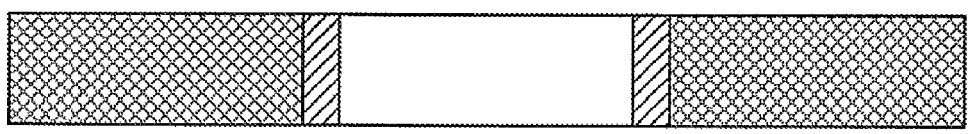
(b)
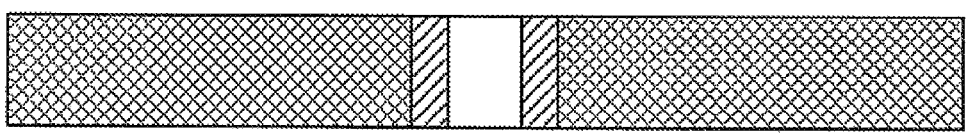
(c)
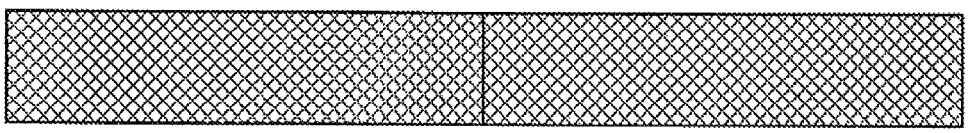
(d)

INFORMATION RECORDING APPARATUS AND METHOD, COMPUTER PROGRAM

TECHNICAL FIELD

The present invention relates to an information recording apparatus and method, such as a DVD recorder, and a computer program which makes a computer function as the information recording apparatus.

BACKGROUND ART

In an information recording medium, such as a DVD-ROM (DVD-Read Only Memory), a DVD-R (DVD-Recordable), and a BD-ROM, there is also developed a multilayer type or dual-layer type optical disc or the like on which a plurality of recording layers are laminated or bonded on a same substrate, as described in patent documents 1, 2 or the like. Moreover, if recording is performed on the dual-layer type, i.e. two-layer type optical disc, e.g. a two-layer type DVD-R disc, an information recording apparatus, such as a DVD recorder, focuses a laser beam for recording on a recording layer located on the front side (i.e. on the closer side to an optical pickup) viewed from the irradiation side of the laser beam (referred to as a "L0 layer" as occasion demands in the application), to thereby record data into the L0 layer in a heat change recording method (in other words, an irreversible recording method), and it focuses the laser beam, through the L0 layer or the like, on a recording layer located on the rear side (i.e. on the farther side from the optical pickup) viewed from the irradiation side of the laser beam (referred to as a "L1 layer" as occasion demands in the application), to thereby record information into the L1 layer in the heat change recording method.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

In a DVD and a CD, a ROM disc and an R/RW disc use different tracking methods. Therefore, in general, a read-only device cannot accurately access an unrecorded portion on a DVD-R, a DVD-RW disc, or the like. On the other hand, in a data recorded portion, since a signal which is compatible with the ROM is recorded, even the read-only device can reproduce it accurately. In a single-layer type optical disc, in order to make it reproducible by the read-only device, for example, the same structure as that of the ROM disc is achieved by recording continuous areas of lead-in, data and lead-out. Incidentally, the lead-in and the lead-out play a role as buffer areas for preventing a pickup from jumping into an unrecorded portion on the inner or outer circumference.

On the other hand, in a dual-layer type optical disc, in order to make the disc reproducible by the read-only device, basically, it is necessary to adopt the same structure as that of the dual-layer ROM disc. That is, the lead-in needs to be recorded in the L0 layer on the innermost circumference, the lead-out needs to be recorded in the L1 layer on the innermost circumference, and a structures which are equivalent to those of the middle areas needs to be recorded in the outermost circumferential portion of the recorded data so that the L0 layer and the L1 layer are vertically symmetric. The data is recorded into an area between the lead-in or lead-out and the middle area; however, it needs to be constructed such that an unrecorded portion is not left. That is, the L1 layer which is located symmetrically to the data recording area in the L0 layer needs to be recorded.

In the DVD-R and the CD-R, the recording is performed without recording the lead-in and the lead-out, during the data recording. If the compatibility with the read-only device is required from a user's instruction, a finalize process is performed, to thereby record the lead-in, the lead-out, or the like, and to provide the compatibility with the ROM disc. On the other hand, in a rewritable DVD-RW, in addition to a format process (or normal format), which forms the same structure as that of the ROM disc from the beginning, a quick format process which start the recording by recording only minimum necessary management information. In the quick-formatted disc, additional recording needs to be performed from the end edge portion of the recorded portion, as in the DVD-R, in the unrecorded portion. Moreover, during the recording, since the lead-in, the lead-out, or the like is not recorded in a complete form, it is necessary to make it reproducible by the read-only device, by performing the finalize process (or compatibility close process) as in the DVD-R.

If such additional recording is performed on the dual-layer disc, layer jump recording in which the data is alternately recorded into the L0 layer and the L1 layer is mainly performed, as method for making the disc compatible with the read-only device immediately responding to the user's instruction. As a specific aspect of the layer jump recording, when a certain size of data is recorded, its half size of data is recorded into the L0 layer and the rest of half size of data is recorded into the L1 layer.

If such layer jump recording is performed, the aforementioned finalize process (in other words, a compatible close process) needs to be performed in order to reproduce the data recorded by the layer jump recording on an information reproducing apparatus, such as a ROM drive. Specifically, by the finalize process, the lead-in area and the lead-out area are formed, and the middle area is formed following the recorded data. By this, it is possible to significantly conform the data structure of the rewritable optical disc, such as a DVD-RW, to the data structure of the read-only optical disc, such as a DVD-ROM. As a result, the data recorded by the layer jump recording can be reproduced by the information reproducing apparatus, such as a ROM drive.

In a write-once type disc, such as a DVD-R, if there is an unrecorded portion in the outer circumferential portion of the buffer area (border zone), such as a middle area, after the finalize process is performed, it is possible to perform the additional recording again. However, since the middle area is formed due to the finalize process, a recording capacity for recording user data including various contents, such as a movie and music, is reduced by repeating the additional recording process and the finalize process. That is, because the user data cannot be recorded in the middle area, as a plurality of middle areas are formed more on the optical disc by performing the finalize process a plurality of times, the recording capacity for recording the user data is reduced more.

In view of the aforementioned conventional problems, it is therefore an object of the present invention to provide an information recording apparatus and method which allows an effective use of a recording capacity, and a computer program which makes a computer function as the information recording apparatus.

Means for Solving the Subject

The above object of the present invention can be achieved by an information recording apparatus provided with: a recording device for recording data onto an information recording medium provided with a first recording layer and a second recording layer; a first controlling device for controlling the recording device to record the data into each of the first recording layer and the second recording layer; a forming device for forming a compatibility area for realizing reproduction compatibility of the information recording medium on an information recording apparatus, following the data recorded in each of the first recording layer and the second recording layer; and a second controlling device for controlling the recording device to record the data into the formed compatibility area if the data is recorded after the compatibility area is formed.

The above object of the present invention can be also achieved by an information recording method in an information recording apparatus provided with: a recording device for recording data onto an information recording medium provided with a first recording layer and a second recording layer, the information recording method provided with: a first controlling process of controlling the recording device to record the data into each of the first recording layer and the second recording layer; a forming process of forming a compatibility area for realizing reproduction compatibility of the information recording medium on an information recording apparatus, following the data recorded in each of the first recording layer and the second recording layer; and a second controlling process of controlling the recording device to record the data into the formed compatibility area if the data is recorded after the compatibility area is formed.

The above object of the present invention can be also achieved by a computer program for recording control and for controlling a computer provided in the first information recording apparatus of the present invention described above, the computer program making the computer function as at least one portion of the first controlling device, the forming device, and the second controlling device.

These effects and other advantages of the present invention will become more apparent from the embodiments explained below.

BRIEF DESCRIPTION OF DRAWINGS

FIG. 1 are a substantial plan view showing the basic structure of an optical disc in an example, a schematic cross sectional view showing the optical disc, and its corresponding schematic conceptual view showing a recording area structure in the radial direction.

FIG. 2 is a schematic cross sectional view showing the optical disc, and its corresponding schematic conceptual view showing the recording area structure in the radial direction.

FIG. 3 are an explanatory view conceptually showing the data structure of an optical disc 100 after a normal format process is performed thereon and an explanatory view conceptually showing the data structure of an optical disc 100 after a quick format process is performed thereon.

FIG. 4 is a diagram conceptually showing transition of the status of the optical disc.

FIG. 5 is a data structure diagram conceptually showing a data structure related to an attribute given when data is recorded.

FIG. 6 is a block diagram conceptually showing the basic structure of an information recording/reproducing apparatus in an example.

FIG. 7 is a data structure diagram conceptually showing a data structure on the optical disc when data recording is performed on the optical disc by the information recording/reproducing apparatus in the example.

FIG. 8 is a data structure diagram conceptually showing one data structure on the optical disc when a quick grow format process is performed on the status shown in FIG. 7.

FIG. 9 is a data structure diagram conceptually showing a data structure on the optical disc when the data recording and a finalize process is performed on the status shown in FIG. 8.

FIG. 10 is a data structure diagram conceptually showing another data structure on the optical disc when a quick grow format process is performed on the status shown in FIG. 7.

FIG. 11 is a data structure diagram conceptually showing a data structure on the optical disc when the quick grow format process, the data recording, and the finalize process are performed on the status shown in FIG. 9.

FIG. 12 is a data structure diagram conceptually showing a data structure on the optical disc when the data is recorded in an entire data area.

FIG. 13 are data structure diagrams conceptually showing data structures on a logical volume space of the optical disc when the data recording is performed in the aspects of FIG. 7 to FIG. 12.

DESCRIPTION OF REFERENCE CODES

100 optical disc
102 lead-in area
105, 115 data area
106, 116 shifted middle area
109, 119 fixed middle area
118 lead-out area
200 information recording/reproducing apparatus
300 disc drive
352 optical pickup
353 signal recording/reproducing device
354 CPU
400 host computer

BEST MODE FOR CARRYING OUT THE INVENTION

Hereinafter, as the best mode for carrying out the invention, a description will be given on embodiments of the information recording apparatus and method, and the computer program of the present invention.

Embodiment of Information Recording Apparatus

A first embodiment of the information recording apparatus of the present invention is an information recording apparatus provided with: a recording device for recording data onto an information recording medium provided with a first recording layer and a second recording layer; a first controlling device for controlling the recording device to record the data into each of the first recording layer and the second recording layer; a forming device for forming a compatibility area for realizing reproduction compatibility of the information recording medium on an information recording apparatus, following the data recorded in each of the first recording layer and the second recording layer; and a second controlling device for controlling the recording device to record the data into the formed compatibility area if the data is recorded after the compatibility area is formed.

According to the embodiment of the information recording apparatus of the present invention, by the operation of the recording device, the data including various contents, such as a movie and music, can be recorded into each of the first recording layer and the second recording layer. In the embodiment, in particular, by the operation of the first controlling operation, the data is recorded alternately into the first recording layer and the second recording layer. That is, the data is recorded into a partial recording area in the first recording layer, and then the data is recorded into a partial recording area in the second recording layer facing the partial recording area in the first recording layer. After that, the data is recorded again into another partial recording area in the first recording layer, and then the data is recorded into another partial recording area in the second recording layer facing the partial recording area in the first recording layer. After that, such a recording operation is continued. In other words, the data is recorded such that the recording area in which the data is already recorded in the first recording layer and the recording area in which the data is already recorded in the second recording area expand substantially equally. More specifically, for example, when 2 GB data is recorded, 1 GB data of the 2 GB data is recorded into the recording area in the first recording layer, and the rest of 1 GB data of the 2 GB data is recorded into the recording area in the second recording layer facing the recording area in the first recording layer in which the 1 GB data is recorded. Alternatively, 1.1 GB data of the 2 GB data is recorded into the recording area in the first recording layer, and the rest of 0.9 GB data of the 2 GB data and 0.2 GB padding data (e.g. "00h" data or the like) may be recorded into the recording area in the second recording layer facing the recording area in the first recording layer in which the 1.1 GB data is recorded. Such a recording operation is referred to as layer jump recording. Incidentally, the layer jump recording does not have to be performed on the entire information recording medium. The layer jump recording may be performed when the data is recorded onto one portion of the information recording medium, and then a recording operation other than the layer jump recording may be performed when the data is recorded into another portion of the information recording medium.

In the embodiment, in particular, by the operation of the forming device, the compatibility area (e.g. a shifted middle area described later) is formed following the data which is recorded by the operation of the recording device, for example, in a finalize process (moreover, in a normal format process if the information recording medium is a blank disc). The compatibility area has a function of realizing the compatibility between the information recording medium in the embodiment and a read-only type information recording medium. In other words, the compatibility area needs to be formed in order that an information reproducing apparatus for the reproduction of the read-only type information recording medium can reproduce the information recording medium in the embodiment. In addition, when the data is recorded alternately into the first recording layer and the second recording layer, layer jump is performed to change the recording layer to record therein the data. The compatibility area has a function of preventing the recording layer in which the data is unrecorded, from being irradiated with a laser beam or the like after the layer jump. Moreover, the compatibility area has a function of preventing the irradiation position of the laser beam from jumping toward the outer circumferential side of the compatibility area. That is, it can be said that the compatibility area is an extremely necessary recording area if the layer jump recording is performed on the information recording medium with the plurality of recording layers.

Moreover, if the data recording is performed after the compatibility area is formed, the data is also recorded into the compatibility area. In other words, if the data recording is performed after the compatibility area is formed, the compatibility area is overwritten with the data, without leaving the compatibility area as it is on the information recording medium. Therefore, the compatibility area is not left as the recording area in which the data including the various contents, such as a movie and music, cannot be recorded, even if the finalize process is performed a plurality of times. That is, the data desired by the user can be recorded even into the recording area in which the compatibility area is once formed.

By this, even if the compatibility area is necessarily formed by the layer jump recording, the various data desired by the user can be recorded into the compatibility area if necessary. Therefore, the layer jump recording can be performed without reducing the recording capacity of the recording area in which the various data desired by the user can be recorded. That is, according to the information recording apparatus in the embodiment, it is possible to receive such an excellent effect that "the recording capacity of the information recording medium can be efficiently used", which will never be attained by performing only the layer jump recording with merely forming the compatibility area.

In one aspect of the embodiment of the information recording apparatus of the present invention, it is further comprising a formatting device for performing a format process to allow the data recording, on a desired recording area of the information recording medium, the second controlling device controlling the formatting device to perform the format process from a start edge portion of the compatibility area.

According to this aspect, by the operation of the second controlling device, the formatting device is controlled to perform the format process (e.g. a quick grow format process described later) from the start edge portion of the compatibility area. Therefore, the compatibility area is not left on the information recording medium, and the data desired by the user can be recorded even into the recording area in which the compatibility area is once formed. Therefore, as described above, the layer jump recording, which is optimum in order to efficiently record the data into the plurality of recording layers, can be performed without reducing the recording capacity of the recording area in which the various data desired by the user can be recorded.

In another aspect of the embodiment of the information recording apparatus of the present invention, the recording device records the data while giving an attribute, which corresponds to the recorded data, of a plurality of types of attributes, in each of segmentized area units, the forming device forms the compatibility area while giving a compatibility area attribute of the plurality of types of attributes in each of the segmentized area units, the compatibility area attribute indicating that the data for realizing the reproduction compatibility is recorded, and the second controlling device changes an attribute of the compatibility area to a data area attribute, which indicates a status in which user data (e.g. content data, such as movie data, music data, and data for PC) of the data is recorded.

According to this aspect, when the data is recorded onto the information recording medium, the attribute corresponding to the data recorded in each of the segmentized area units is given in each of the segmentized area units (e.g. in each of sectors described later). Then, the compatibility area attribute (specifically, a middle area attribute described later) is given to the recording area in which the compatibility area is formed. If the data recording is performed after the compatibility area is formed, the second controlling device changes the attribute of the recording area in which the compatibility area is formed to the data area attribute indicating that the user data can be recorded. As a result, the data desired by the user can be recorded even into the recording area in which the compatibility area is once formed. Therefore, as described above, the layer jump recording, which is optimum in order to efficiently record the data into the plurality of recording layers, can be performed without reducing the recording capacity of the recording area in which the various data desired by the user can be recorded.

In an aspect of the information recording apparatus in which the data is recorded with the attribute given, as described above, the plurality of types of attributes may include at least one of a lead-in area attribute, a lead-out area attribute, the data area attribute, and a compatibility area attribute.

By virtue of such construction, it is possible to preferably identify the attribute of the recording area on the information recording medium.

Embodiment of Information Recording Method

A first embodiment of the information recording method of the present invention is an information recording method in an information recording apparatus provided with: a recording device for recording data onto an information recording medium provided with a first recording layer and a second recording layer, the information recording method provided with: a first controlling process of controlling the recording device to record the data into each of the first recording layer and the second recording layer; a forming process of forming a compatibility area for realizing reproduction compatibility of the information recording medium on an information recording apparatus, following the data recorded in each of the first recording layer and the second recording layer; and a second controlling process of controlling the recording device to record the data into the formed compatibility area if the data is recorded after the compatibility area is formed.

According to the embodiment of the information recording method of the present invention, it is possible to receive the same various benefits as those of the embodiment of the information recording apparatus of the present invention.

Incidentally, in response to the various aspects of the embodiment of the aforementioned information recording apparatus of the present invention, the embodiment of the information recording method of the present invention can employ various aspects.

Embodiment of Computer Program

An embodiment of the computer program of the present invention is a computer program for recording control and for controlling a computer provided in the aforementioned embodiment of the information recording apparatus of the present invention (including its various aspects), the computer program making the computer function as at least one portion of the first controlling device, the forming device, and the second controlling device.

According to the embodiment of the computer program of the present invention, the aforementioned embodiment of the information recording apparatus of the present invention (including its various aspects) can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned embodiment of the information recording apparatus of the present invention, the embodiment of the computer program of the present invention can also employ various aspects.

The above object of the present invention can be also achieved by a embodiment of a computer program product in a computer-readable medium for tangibly embodying a program of instructions executable by a computer provided in the aforementioned embodiment of the information recording apparatus of the present invention (including its various aspects), the computer program product making the computer function as at least one portion of the first controlling device, the forming device, and the second controlling device.

According to the embodiment of the computer program product of the present invention, the aforementioned embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information recording apparatus of the present invention.

Incidentally, in response to the various aspects of the aforementioned embodiment of the information recording apparatus of the present invention, the embodiment of the computer program product of the present invention can also employ various aspects.

These effects and other advantages of the present invention will become more apparent from the example explained below.

As explained above, according to the embodiment of the information recording apparatus of the present invention, it is provided with the recording device, the first controlling device, the forming device, and the second controlling device. According to the embodiment of the information recording method of the present invention, it is provided with the first controlling process, the forming process, and the second controlling process. According to the embodiment of the computer program of the present invention, it makes a computer function as one portion of the first controlling device, the forming device, and the second controlling device. Therefore, it is possible to effectively use the recording capacity of the information recording medium.

Example

Examples of the present invention will be explained on the basis of the drawings.

Firstly, with reference to FIGS. 1, a description will be given on an optical disc 100 as an example of the information recording medium of the present invention. FIG. 1(*a*) is a substantial plan view showing the basic structure of the optical disc 100, and FIG. 1(*b*) is a schematic cross sectional view of the optical disc and its corresponding schematic conceptual view showing a recording area structure in the radial direction.

As shown in FIG. 1(*a*) and FIG. 1(*b*), the optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 116; and fixed middle areas 109 and 119. Then, in the optical disc 100, recording layers or the like are laminated on a transparent substrate 110, for example. In each recording area of the recording layers, a track or tracks, such as groove tracks and land tracks, are alternately placed, spirally or concentrically, centered on the center hole 101. Moreover, on the track, data is divided and recorded by a unit of ECC block. The ECC block is a data management unit in which the record information can be error-corrected.

Incidentally, the present invention is not particularly limited to the optical disc having the three areas, as described above. For example, even if the lead-in area 102, the lead-out area 118 or the fixed middle areas 109 and 119 do not exist, a data structure and the like explained below can be constructed. Moreover, as described later, the lead-in area 102, the lead-out area 118 or the fixed middle areas 109 and 119 may be further segmentized.

In particular, the optical disc 100 in the example, as shown in FIG. 1(*b*), has such a structure that an L0 layer and an L1 layer, which constitute one example of the first and second recording layers of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of a laser beam LB, irradiated from the lower side to the upper side in FIG. 1(*b*). In particular, in the L0 layer, the data is recorded from the inner circumferential side to the outer circumferential side, while in the L1 layer, the data is recorded from the outer circumferential side to the inner circumferential side. In other words, the optical disc 100 in the example corresponds to an optical disc of an opposite track path type. However, even an optical disc of a parallel track path type can also receive various benefits described later, by adopting a structure discussed below.

Moreover, in the optical disc 100 in the example, layer jump recording is adopted in which data is recorded alternately into the L0 layer and the L1 layer. Specifically explaining the layer jump recording, the data is recorded into a partial recording area in the L0 layer before the data is recorded into a partial recording area in the L1 layer that faces the partial recording area in the L0 layer. After that, the data is recorded into another partial recording area in the L0 layer before the data is recorded into another partial recording area in the L1 layer that faces the another partial recording area in the L0 layer. This operation is repeated subsequently.

Moreover, the optical disc 100 in the example is not limited to a dual-layer, single-sided type, i.e., a dual layer type, but may be a dual-layer, double-sided type. Furthermore, the optical disc 100 in the example is not limited to the optical disc having the two recording layers, as described above, but may be an optical disc of a multilayer type which has three or more layers.

Incidentally, the fixed middle area 109 and 119 are formed to provide the compatibility between a read-only optical disc, such as a DVD-ROM, and the optical disc 100 in the example after the data is recorded into all the data areas 105 and 115. That is, the fixed middle area 109 and 119 are formed to conform an area structure on the optical disc 100 in the example to an area structure on the dual-layer type read-only optical disc. In addition, the fixed middle area 109 and 119 have a function of preventing an optical pickup from jumping into an unrecorded area (specifically the outer circumferential side of the fixed middle area 109 and 119) when the layer jump is performed to change the recording layer or when near the fixed middle area 109 and 119 are accessed, after the data is recorded in all the data areas 105 and 115. If the data is recorded only in one portion of the data areas 105 and 115, shifted middle areas 106 and 116 are used instead of the fixed middle area 105 and 115.

Now, with reference to FIG. 2, the shifted middle areas 106 and 116 will be explained. FIG. 2 is a schematic cross sectional view showing the optical disc 100, and its corresponding schematic conceptual view showing the recording area structure in the radial direction.

As shown in FIG. 2, the shifted middle area 106 is disposed in the data area 105, following the data recorded in one portion of the data area 105. In the same manner, the shifted middle area 116 is disposed in the data area 115, following the data recorded in one portion of the data area 115.

The disposing of the shifted middle areas 106 and 116 allows the compatibility between the read-only optical disc, such as a DVD-ROM, and the optical disc 100 in the example even if the data is recorded only in one portion of the data areas 105 and 115. In addition, the disposing can prevent the optical pickup from jumping into the unrecorded area when the layer jump is performed. Moreover, even when the layer jump is not performed, it is possible to prevent the optical pickup from jumping into an unrecorded area that is located on the outer circumferential side of the shifted middle areas 106 and 116. Thus, a read-only type information reproducing apparatus can reproduce the data recorded on the optical disc 100.

That is, the shifted middle areas 106 and 116 have both a function of maintaining the compatibility with the read-only type optical disc and a function of preventing the jump of the optical pickup, in the case that the data is recorded only in one portion of the data areas 105 and 115. In particular, in the case of layer jump recording, the data is recorded only in one portion of the data areas 105 and 115 in most cases. Therefore, the shifted middle areas 106 and 116 are effectively used particularly in the layer jump recording.

On the other hand, the fixed middle areas 109 and 119 have both a function of maintaining the compatibility with the read-only type optical disc and a function of preventing the jump of the optical pickup, in the case that the data is recorded in all the data areas 105 and 115.

In the lead-in area 102, the lead-out area 118, the fixed middle areas 109 and 119, and the shifted middle areas 106 and 116, predetermined data (e.g. various control data, padding data, such as "00h", or the like) is recorded by performing a normal format process on the optical disc 100. Moreover, a quick format process for recording only minimum necessary management information to start the data recording is also performed on the optical disc 100, in addition to the normal format process.

Now, with reference to FIG. 3 and FIG. 4, the normal format process and the quick format process are specifically explained. FIG. 3 are an explanatory view conceptually showing the data structure of the optical disc 100 after the normal format process is performed thereon (FIG. 3(*a*)) and an explanatory view conceptually showing the data structure of the optical disc 100 after the quick format process is performed thereon (FIG. 3(*b*)). FIG. 4 is a diagram conceptually showing transition of the status of the optical disc 100.

As shown in FIG. 3(*a*), if the normal format process is performed, the predetermined data is recorded into the lead-in area 102 while a lead-in area attribute is given, and the predetermined data is recorded into the lead-out area 118 while a lead-out area attribute is given.

Moreover, the shifted middle area 106 is formed by recording the predetermined data into a recording area following the data recorded in the data area 105 while a middle area attribute is given, and the shifted middle area 116 is formed by recording the predetermined data into a recording area following the data recorded in the data area 115 while a middle area attribute is given. Alternatively, in accordance with a format size requested from a host computer or the like described later, the predetermined data is recorded into the data areas 105 and 115 while a data area attribute is given, and the shifted middle areas 106 and 116 may be formed following the recorded data.

By performing the normal format process as described above, it is possible to substantially conform the area structure on the optical disc 100 to the area structure on the read-only type optical disc. The status of the optical disc 100 shown in FIG. 3(a) is referred to as a "complete status".

On the other hand, as shown in FIG. 3(b), if the quick format process is performed, minimum necessary data is recorded into the lead-in area 102 while a data area attribute is given. Moreover, in accordance with the format size requested from the host computer or the like described later, the predetermined data is recorded into the data areas 105 and 115, if necessary, while a data area attribute given, and an intermediate lead-out area 108 with a size of 32 ECC blocks is formed following the recorded data. In the intermediate lead-out area 108, the predetermined data is recorded, if necessary, while a lead-out attribute is given. The status of the optical disc 100 shown in FIG. 3(b) is referred to as an "intermediate status".

Incidentally, the format size requested from the host computer or the like may be "0". In this case, the intermediate lead-out area 108 is formed so as to be adjacent to the data recorded in the lead-in area 102 while the data area attribute is given.

By performing the quick format process as described above, it is possible to record the data into a partial recording area of the data area 105 while the data area attribute is given. More specifically, in a recording area in which no data is recorded (in other words, a recording area to which no attribute is given), it is necessary to record the data sequentially (in other words, continuously from the inner circumferential side to the outer circumferential side). That is, since a NWA (Next Writable Address), which indicates a recording area in which the data can be recorded next, indicates a head portion of the recording area in which the data is not recorded, it is necessary to record the data in order (i.e. sequentially) from the recording area indicated by the NWA, in a recording area on the outer circumferential side of the NWA. However, in a recording area which is located on the inner circumferential side of the position indicated by the NWA and to which the data area attribute is given, it is possible to record the data at a desired position (i.e. randomly). As described above, it can be said that the quick format process also has a function of updating the NWA to thereby enlarge the recording area in which the data can be recorded.

Moreover, in the quick-formatted optical disc 100, as opposed to the case that the normal format process is performed, all the necessary data is not recorded in the lead-in area 102, the lead-out area 118, or the like. Therefore, the various management information or various control information corresponding to an aspect of recording the data on the optical disc 100 is recorded into the lead-in area 102, the lead-out area 118, or the like by further performing a finalize process after the quick format process. Moreover, the shifted middle areas 106 and 116 and the fixed middle areas 109 and 119 are formed following the recorded data, and padding data, such as "00h" data, is recorded into an unrecorded area between the lead-in area 102 and the shifted middle area 106 (or the fixed middle area 109) and an unrecorded area between the lead-out area 118 and the shifted middle area 116 (or the fixed middle area 119). By this, it is possible to perform the reproduction on the optical disc 100 in the example, on the read-only type information reproducing apparatus.

Incidentally, the size of the data recorded in the L0 layer and the size of the data recorded in the L1 layer are not the same in some cases, depending on the size of the data recorded into the optical disc 100. Specifically, there is such a case that xGB data is recorded from the inner circumferential side to the outer circumferential side in the L0 layer, then the layer jump is performed, and then x/2 MB data is recorded from the outer circumferential side to the inner circumferential side in the L1 layer. In this case, there is the recording area, which corresponds to the recording area in the L0 layer in which the data is already recorded, in which the data is not recorded in the L1 layer. On the other hand, from the viewpoint of stable data reproduction, some data needs to be recorded (in other words, it is not in a mirror status) in the recording area in the L1 layer facing the recording area in the L0 layer in which the data is already recorded. Therefore, in the recording area in the L1 layer in which the data is not recorded and which faces the recording area in the L0 layer in which the data is already recorded, it is necessary to record the predetermined data while a data area attribute is given. Alternatively, in the recording area in the L1 layer in which the data is not recorded and which faces the recording area in the L0 layer in which the data is already recorded, it may be constructed to record the predetermined data (i.e. padding data or the like) while a lead-out area attribute is given.

Moreover, if the quick format process, in which the predetermined data is recorded into the shifted middle areas 106 and 116 or the like while a data area attribute is given, is performed on the optical disc 100 in the complete status shown in FIG. 3(a), it is possible to record the data again onto the optical disc 100 which once becomes in the complete status. As described above, the quick format process performed to record the data again onto the optical disc 100 in the complete status can be referred to as a quick grow format process.

As shown in FIG. 4, the status of the optical disc 100 can be transited into the complete status shown in FIG. 3(a) by performing the normal format process on the blank optical disc 100 on which the data is not recorded. In the same manner, the status of the optical disc 100 can be transited into the intermediate status shown in FIG. 3(b) by performing the quick format process on the new optical disc 100.

The status of the optical disc 100 can be maintained in the complete status shown in FIG. 3(a) by performing the normal format process on the optical disc 100 transited into the complete status. Moreover, the status of the optical disc 100 can be transited into the intermediate status shown in FIG. 3(b) by performing the quick format process (in other words, quick grow format process) on the optical disc 100 transited into the complete status.

The status of the optical disc 100 can be maintained in the intermediate status shown in FIG. 3(b) by performing the quick format process on the optical disc 100 transited into the intermediate status. Moreover, the status of the optical disc 100 can be transited into the complete status shown in FIG. 3(a) by performing the normal format process on the optical disc 100 transited into the intermediate status.

Next, with reference to FIG. 5, a specific description will be given on the attribute given when the data is recorded. FIG. 5 is a data structure diagram conceptually showing the data structure related to the attribute given when data is recorded.

The attribute is given for each physical sector with a size of 2418 bytes, in accordance with the data recorded in the physical sector. One physical sector is provided with: a SYNC code with a size of 52 bytes; an ECC (Error Correction Code) with a size of 302 bytes; user data with a size of 2048 bytes; a data ID with a size of 4 bytes; an IED with a size of 2 bytes;

CPR_MAI with a size of 6 bytes; and an EDC with a size of 4 bytes. Then, the attribute is recorded in the data ID.

Specifically, as shown in FIG. 5, the data ID with a size of 4 bytes includes sector information with a size of 1 byte and a sector number with a size of 3 bytes.

The sector information with a size of 1 byte includes: a sector format type with a size of 1 bit; a tracking method with a size of 1 bit; reflectivity with a size of 1 bit; a reserved area with a size of 1 bit; an area type with a size of 2 bits indicating the attribute; a data type with a size of 1 bit; and a layer number with a size of 1 bit.

The area type indicates the attribute of the physical sector including the area type. Specifically, for example, if "00b" is recorded, it indicates that the physical sector is the data area attribute. If "01b" is recorded, it indicates that the physical sector is the lead-in area attribute. If "10b" is recorded, it indicates that the physical sector is the lead-out area attribute. If "11b" is recorded, it indicates that the physical sector is the middle area attribute.

(Information Recording/Reproducing Apparatus)

Next, with reference to FIG. 6, a description will be given on an information recording/reproducing apparatus 200, as an example of the information reproducing apparatus of the present invention. FIG. 6 is a block diagram conceptually showing the basic structure of the information recording/reproducing apparatus 200 in the example. Incidentally, the information recording/reproducing apparatus 200 has a function of recording data onto an optical disc 100 and a function of reproducing the data recorded on the optical disc 100.

As shown in FIG. 6, the information recording/reproducing apparatus 200 is provided with: a disc drive 300 on which the optical disc 100 is actually loaded and on which data recording and data reproduction are performed; and a host computer 400, such as a personal computer, for controlling the data recording and reproduction with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the holographic recording medium 1. More specifically, the spindle motor 351 is adapted to rotate and stop the optical disc 100 at a predetermined speed, under spindle servo from a not-illustrated servo unit or the like.

The optical pickup 352 is provided with e.g. a not-illustrated semiconductor laser element, collimator lens, objective lens, and the like, in order to perform the recording and the reproduction on the optical disc 100. More specifically, the optical pickup 352 irradiates the optical disc 100 with a light beam, such as a laser beam, with a first power as reading light in the reproduction, and with a second power and with it modulated as writing light in the recording.

The signal recording/reproducing device 353 constitutes one specific example of the "recording device" of the present invention. The signal recording/reproducing device 353 constitutes one specific example of the "first recording device", the "second recording device", and the "formatting device" of the present invention, together with the CPU 354. The signal recording/reproducing device 353 controls the spindle motor 351 and the optical pickup 352 under the control of the CPU 354, to thereby perform the recording and the reproduction on the optical disc 100. More specifically, the signal recording/ reproducing device 353 is provided with e.g. a laser diode driver (LD driver), a head amplifier, and the like. The laser diode driver generates e.g. a driving pulse and drives the semiconductor laser element disposed in the optical pickup 352. The head amplifier amplifies an output signal of the optical pickup 352, i.e. reflected light of the light beam, and outputs the amplified signal.

The memory 355 is used in the general data processing and an OPC process on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as the recorder equipment, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Typically, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record, to the CPU 359. The CPU 359 may transmit a control command to the information recording/reproducing apparatus 200, through the data input/output control device 308, on the basis of instruction information from the operation/display control device 307, to thereby control the entire disc drive 300. In the same manner, the CPU 359 can transmit a command for requesting the disc drive 300 to transmit an operational status to the host, with respect to the disc drive 300. By this, the operational status of the disc drive 300, such as during recording, can be recognized, so that the CPU 359 can output the operational status of the disc drive 301 to the display panel 311, such as a fluorescent tube and an LCD, through the operation/display control device 307.

The memory 360 is an internal memory apparatus used by the host computer 400, and it is provided with: a ROM area in which a firmware program, such as BIOS (Basic Input/Output System), is stored; a RAM area in which variables necessary for the operation of an operating system and an application program or the like are stored; and the like. Moreover, the memory 360 may be connected to an external memory apparatus, such as a not-illustrated hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Next, with reference to FIG. 7 to FIG. 13, a description will be given on an aspect of recording the data onto the optical disc 100 by the information recording/reproducing apparatus 200 in the example. FIG. 7 is a data structure diagram conceptually showing one data structure on the optical disc 100 when data recording is performed on the optical disc by the information recording/reproducing apparatus in the example. FIG. 8 is a data structure diagram conceptually showing a data structure on the optical disc 100 when a quick grow format process is performed on the status shown in FIG. 7. FIG. 9 is a data structure diagram conceptually showing a data structure on the optical disc 100 when the data recording and a finalize process is performed on the status shown in FIG. 8. FIG. 10 is a data structure diagram conceptually showing another data structure on the optical disc 100 when a quick grow format process is performed on the status shown in FIG. 7. FIG. 11 is a data structure diagram conceptually showing a data structure on the optical disc 100 when the quick grow format process, the data recording, and the finalize process are performed on the status shown in FIG. 9. FIG. 12 is a data structure diagram conceptually showing a data structure on the optical disc 100 when the data is recorded in an entire data area. FIG. 13 are data structure diagrams conceptually showing data structures on a logical volume space of the optical disc 100 when the data recording is performed in the aspects of FIG. 7 to FIG. 12.

As shown in FIG. 7, after the quick format process is performed, the layer jump recording is performed under the control of the CPU 354 or 359, which constitutes one specific example of the "first controlling device" of the present invention. The data is recorded, in the order that is shown by a black thick-line arrow, into each of an area 105a in the first recording layer, an area 115a in the second recoding layer, an area 105b in the first recording layer, and an area 115b in the second recording layer.

After that, the finalize process is performed. By the finalize process, predetermined data is recorded into the lead-in area 102 and the lead-out area 118, while the lead-in area attribute or lead-out attribute is given. In addition, under the control of the CPU 354 or 359, which constitutes one specific example of the "first controlling device" of the present invention, the shifted middle area 106 is formed following the area 105b, and the shifted middle area 116 is formed following the area 115b.

After that, it is assumed that the quick grow format process is performed on the optical disc 100 in the status shown in FIG. 7. In this case, as shown in FIG. 8, under the control of the CPU 354 or 359, which constitutes one specific example of the "second controlling device" and the "formatting device" of the present invention, an area 105c to which the data area attribute is given is ensured or reserved following the area 105b, and the intermediate lead-out area 108 is ensured following the area 105c. That is, the quick grow format process is performed toward the outer circumferential side from the head portion of the shifted middle area 106. More specifically, the attribute of the shifted middle area 106 formed following the area 105b is changed to the data area attribute, and the attribute of the area following the shifted middle area 106 is set to the data area attribute.

By this, as shown in FIG. 9, the data can be recorded into each of the area 105c following the area 105b, and an area 115c following the area 115b. That is, it is possible to record the data including the various contents, such as a movie and music, even into the recording area in which the shifted middle area 106 or 116 is once formed.

Incidentally, in the quick grow format process in FIG. 8, the explanation is given on the case that the format size requested from the host computer 400 is greater than the size of the shifted middle area 106. However, the format size requested from the host computer 400 may be less than the size of the shifted middle area 106. Even in this case, if the area 105c to which the data area attribute is given is ensured following the area 105b as shown in FIG. 10, the data can be recorded following the area 105b and the area 115b as shown in FIG. 9. This also applies to the case that the format size requested from the host computer 400 is "0".

Alternatively, the quick grow format process is not necessarily performed, but the desired data may be directly recorded while the attribute of the shifted middle area 106 formed following the area 105b is changed to the data area attribute. This also applies to the following explanation.

Moreover, it is also possible to record the data into an area 105d following the area 105c and an area 115d following the area 115c. Moreover, by performing the finalize process, the shifted middle areas 106 and 116 are formed again following the areas 105d and 115d.

After that, if the quick grow format process and the data recording are performed on the optical disc 100 in the status shown in FIG. 9, it is possible to record the data into an area 105e following the area 105d and an area 115e following the area 115d, as shown in FIG. 11. Moreover, by performing the finalize process, the shifted middle areas 106 and 116 are formed again following the areas 105e and 115e.

After this, the aforementioned operation is repeated until the data is recorded in the entire data areas 105 and 115. After the data is recorded in the entire data areas 105 and 115, as shown in FIG. 12, the lead-in area 102, the lead-out area 118, the data areas 105 and 115, and the fixed middle areas 109 and 119 are formed, to thereby provide the assured compatibility with the read-only type optical disc.

FIG. 13 show the data structures on the logical volume space of the optical disc 100 when the data recording is performed in the aspects shown in FIG. 7 to FIG. 12. When the optical disc 100 is in the status shown in FIG. 7, the data structure on the logical volume space is shown in FIG. 13(a). When the optical disc 100 is in the status shown in FIG. 8, the data structure on the logical volume space is shown in FIG. 13(b). When the optical disc 100 is in the status shown in FIG. 9, the data structure on the logical volume space is shown in FIG. 13(c). When the optical disc 100 is in the status shown in FIG. 11, the data structure on the logical volume space is shown in FIG. 13(c). When the optical disc 100 is in the status shown in FIG. 12, the data structure on the logical volume space is shown in FIG. 13(d). As shown in FIG. 13, it is seen that the data including the various contents, such as a movie and music, can be recorded into the recording area in which the shifted middle area 106 or 116 is once formed, even on the logical volume space.

As described above, by changing the attribute of the recording area in which the shifted middle area 106 or 116 is formed, to the data area attribute in the quick grow format process, it is possible to record the data including the various contents, such as a movie and music, into the recording area in which the shifted middle area 106 or 116 is once formed. That is, the shifted middle area 106 or 116 is not left as the recording area in which the data including the various contents, such as a movie and music, cannot be recorded, and the data desired by a user can be recorded into the recording area in which the shifted middle area 106 or 116 is once formed.

This does not allow a reduction in the recording capacity of the recording area in which the various data desired by the user can be recorded. Therefore, the optimum layer jump recording can be performed in order to efficiently record the data into the plurality of recording layers while efficiently using the recording capacity of the optical disc 100. That is, according to the information recording apparatus 200 in the example, it is possible to receive such an excellent effect that "the recording capacity of the optical disc 100 can be efficiently used", which will never be attained by performing only the layer jump recording with merely forming the shifted middle area.

Incidentally, in the aforementioned example, an explanation is given using the dual-layer type optical disc 100; however, not only the dual-layer type optical disc 100 but also a single-layer type optical disc with a single recording layer and an optical disc with three or more recording layers can also receive the aforementioned various benefits by adopting the aforementioned various structures.

Moreover, in the aforementioned examples, an explanation is given on the optical disc 100 as one example of the information recording medium and the recorder related to the optical disc 100 as one example of the information recording apparatus; however, the present invention is not limited to the optical disc and the recorder thereof, and it can be also applied to other various information recording media which support high-density recording or high transmission rate, and recorders thereof.

The present invention is not limited to the aforementioned embodiment, but various changes may be made, if desired, without departing from the essence or spirit of the invention which can be read from the claims and the entire specification. An information recording apparatus and method, and a computer program, all of which involve such changes, are also intended to be within the technical scope of the present invention.

INDUSTRIAL APPLICABILITY

The information recording apparatus and method, and the computer program according to the present invention can be applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus, comprising:
   a recording device for recording data, by a unit of physical sector, onto an information recording medium comprising a first recording layer and a second recording layer while giving an attribute, which corresponds to the recorded data, to each physical sector, wherein each physical sector includes data ID information, the data ID information includes area type information which indicates that the given attribute is a lead-in area attribute, a lead-out area attribute, a data area attribute which indicates a status in which user data of the data is recorded, or a middle area attribute;
   a first controlling device for controlling said recording device to record the data into each of the first recording layer and the second recording layer;
   a forming device for forming a shifted middle area, following the data recorded in each of the first recording layer and the second recording layer, by recording the data into the shifted middle area while giving the middle area attribute to each physical sector, wherein the middle area is an area for realizing reproduction compatibility of the information recording medium on an information reproducing apparatus and the middle area attribute indicates that the data for realizing the reproduction compatibility is recorded; and
   a second controlling device for controlling said recording device to record the data into the formed shifted middle area while changing an attribute of the shifted middle area to the data area attribute if the data is recorded after the shifted middle area is formed.

2. The information recording apparatus according to claim 1, further comprising a formatting device for performing a format process to allow the data recording, on a desired recording area of the information recording medium, said second controlling device controlling said formatting device to perform the format process from a start edge portion of the shifted middle-area.

3. An information recording method in an information recording apparatus, comprising:
   a recording device for recording data, by a unit of physical sector, onto an information recording medium comprising a first recording layer and a second recording layer while giving an attribute, which corresponds to the recorded data, to each physical sector, wherein each physical sector includes data ID information, the data ID information includes area type information which indicates that the given attribute is a lead-in area attribute, a lead-out area attribute, a data area attribute which indicates a status in which user data of the data is recorded, or a middle area attribute, said information recording method comprising:
   a first controlling process of controlling said recording device to record the data into each of the first recording layer and the second recording layer;
   a forming process of forming a shifted middle area, following the data recorded in each of the first recording layer and the second recording layer, by recording the data into the shifted middle area while giving the middle area attribute to each physical sector, wherein the middle area is an area for realizing reproduction compatibility of the information recording medium on an information reproducing apparatus and the middle area attribute indicates that the data for realizing the reproduction compatibility is recorded; and
   a second controlling process of controlling said recording device to record the data into the formed shifted middle area while changing an attribute of the shifted middle area to the data area attribute if the data is recorded after the shifted middle area is formed.

* * * * *